June 5, 1923.

W. R. BUNCH

BRUSH CUTTING MACHINE

Filed May 23, 1921

INVENTOR.
Walter R. Bunch
BY
ATTORNEYS.

June 5, 1923.
W. R. BUNCH
1,457,424
BRUSH CUTTING MACHINE
Filed May 23, 1921
6 Sheets-Sheet 2
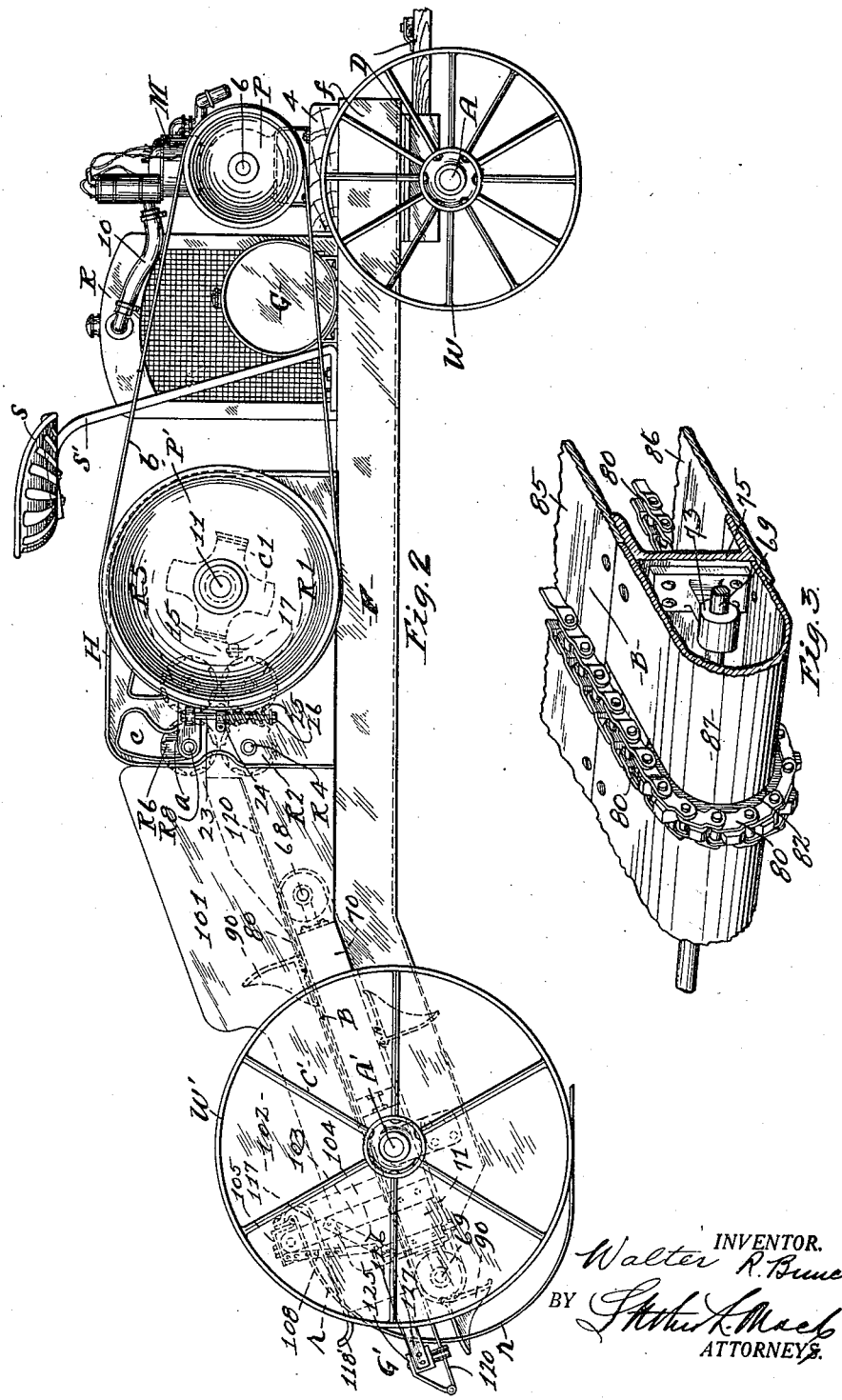
INVENTOR.
Walter R. Bunch
BY
ATTORNEYS.

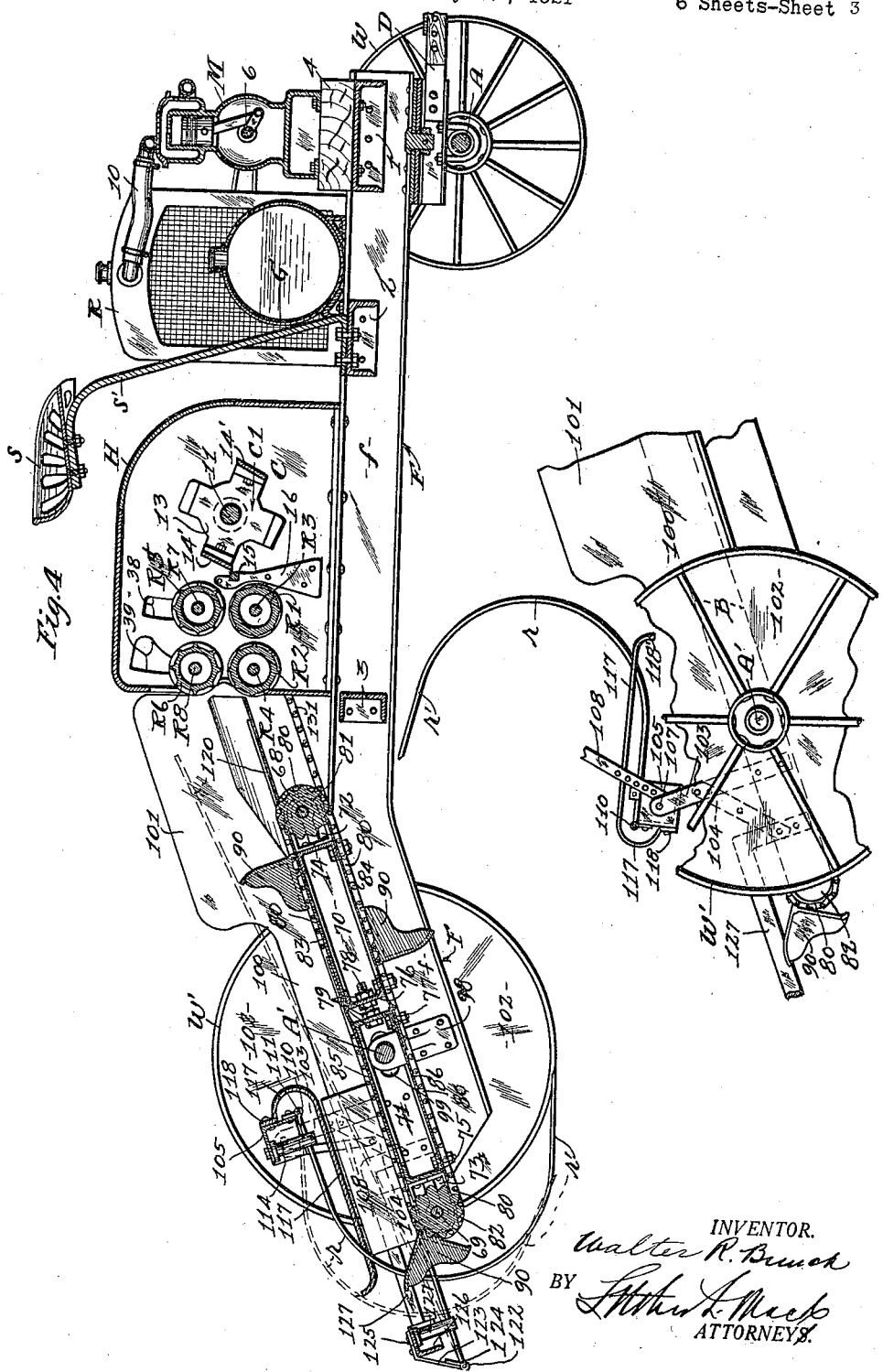

June 5, 1923.
W. R. BUNCH
BRUSH CUTTING MACHINE
Filed May 23, 1921
1,457,424
6 Sheets-Sheet 4
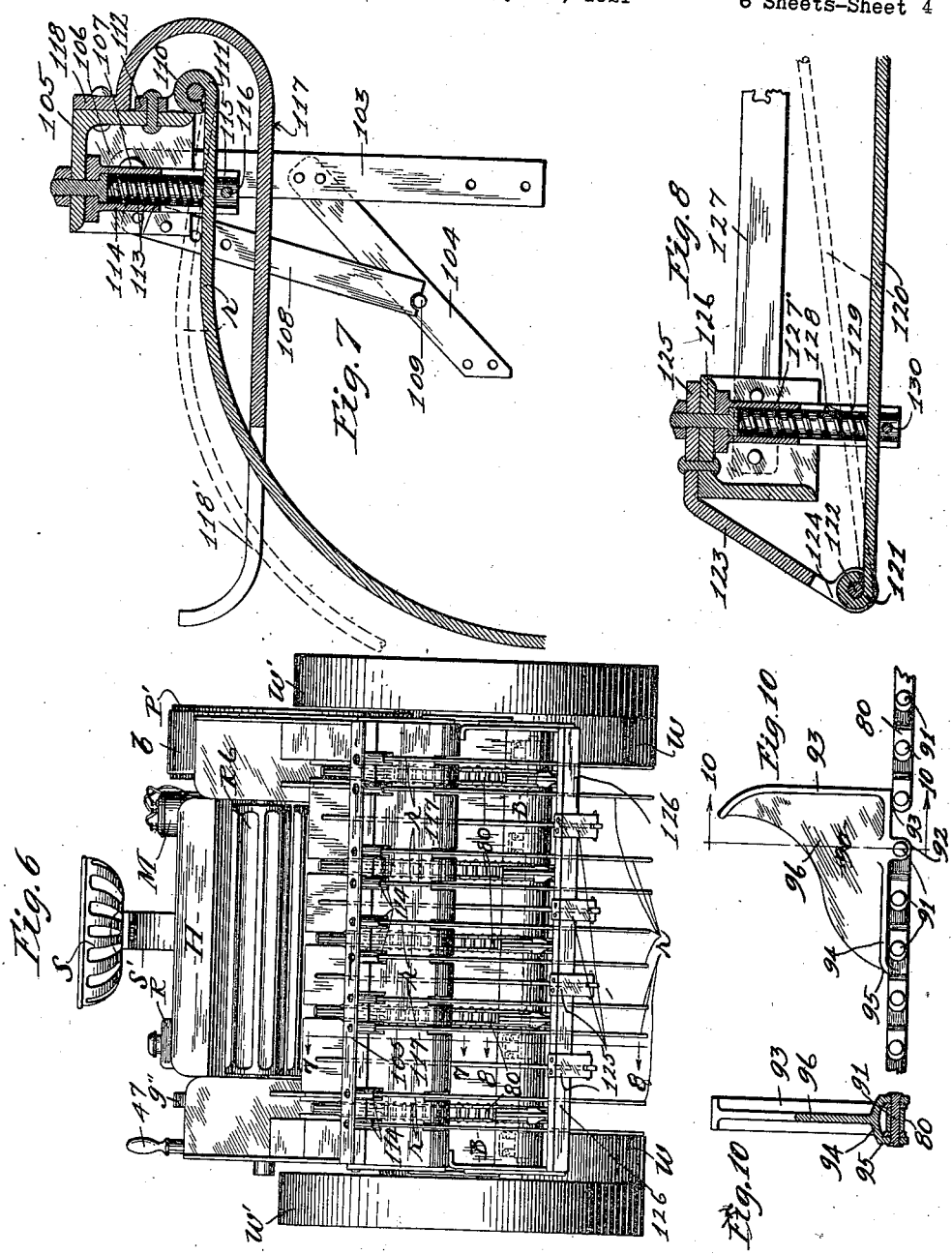
INVENTOR.
Walter R. Bunch
BY
ATTORNEYS.

June 5, 1923.

W. R. BUNCH 1,457,424

BRUSH CUTTING MACHINE

Filed May 23, 1921

INVENTOR.
Walter R. Bunch
BY
ATTORNEYS.

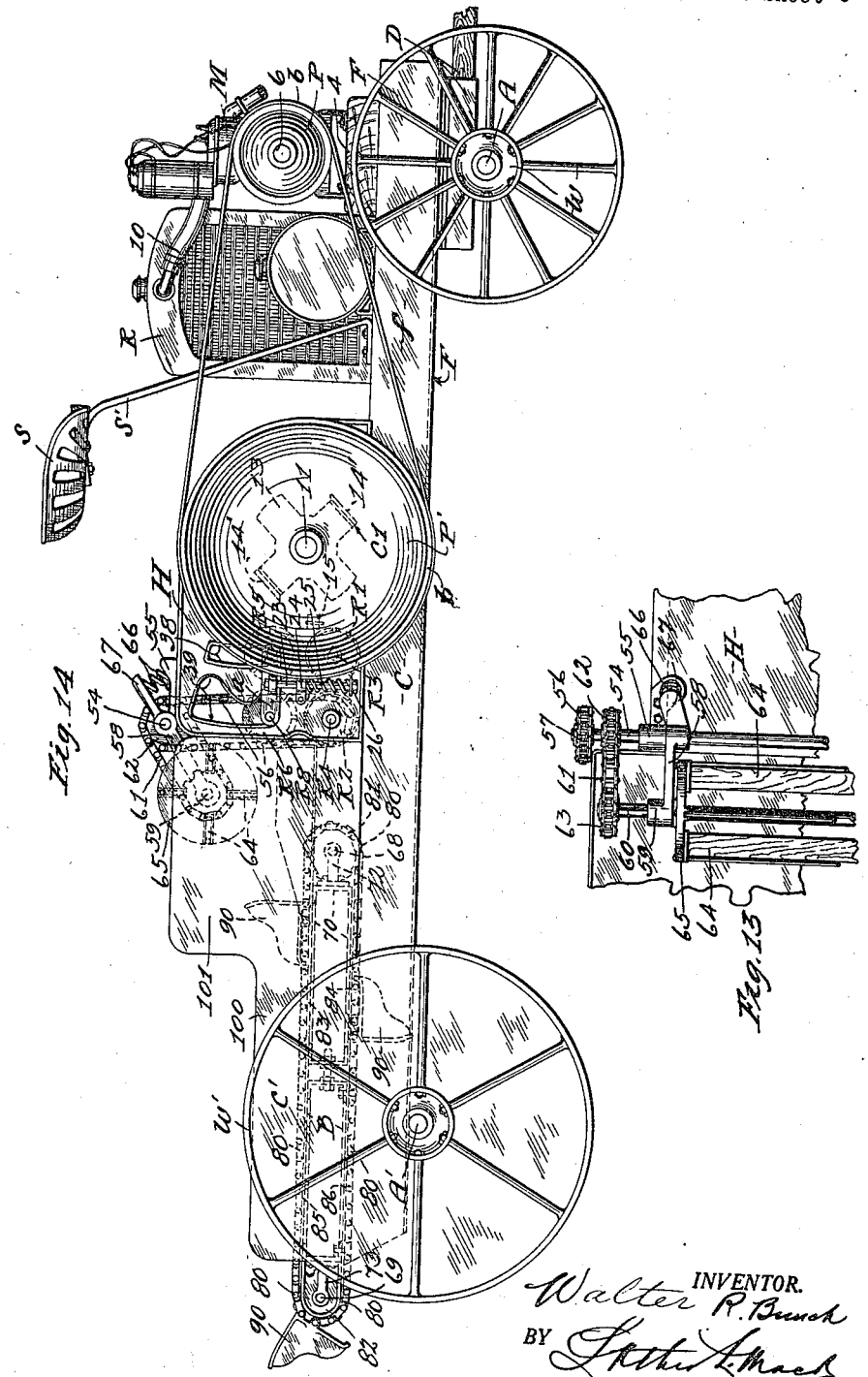

Patented June 5, 1923.

1,457,424

UNITED STATES PATENT OFFICE.

WALTER R. BUNCH, OF LA VERNE, CALIFORNIA, ASSIGNOR OF ONE-HALF TO ARTHUR G. HAMILTON, OF FONTANA, CALIFORNIA.

BRUSH-CUTTING MACHINE.

Application filed May 23, 1921. Serial No. 471,975.

*To all whom it may concern:*

Be it known that I, WALTER R. BUNCH, a citizen of the United States, and a resident of La Verne, in the county of Los Angeles and State of California, have invented new and useful Improvements in Brush-Cutting Machines, of which the following is a specification.

This invention relates to machines for cutting brush and more particularly to a type of machine adapted for use in orchards and vineyards and the like, for collecting and cutting-up the prunings from the trees and vines, and reducing the same to fine chips whereby the fine cuttings thus provided may be re-deposited upon the ground for fertilizing the soil.

It will be understood in the consideration of this invention that heretofore it has been necessary to collect and remove the prunings from orchards and vineyards and to burn the same in order that they may be finally disposed of. It is a well-known fact however, that these prunings are possessed of certain characteristics which will greatly facilitate the fertilization of the soil, provided that they may be reduced to small particles and uniformly distributed over the surface of the ground. To this end I have provided a machine which is adapted to be propelled in any suitable manner by draft animals or a motor tractor, between the rows of trees in an orchard, or between the rows of vines in a vineyard, for collecting the prunings from the trees or vines mechanically and conveying the same to a crushing and cutting means, whereby the prunings may be reduced to small particles and re-deposited on the ground as the machine is moved thereover, thus eliminating all manual efforts in the collecting and distribution of the brush.

My machine embodies a self-contained power plant, a rake serving as a collector unit positioned in the rear end of the vehicle and adapted to be drawn over the ground for guiding the brush over the bed of the vehicle, a conveyer mechanism adapted to receive the brush from the collecting unit and to convey the brush forwardly over the bed of the vehicle, and a cutting unit adapted to receive and cut the brush as it is fed thereto, from said conveyer units.

As the description of my invention progresses, certain novel characteristics and functions will be disclosed, and I have illustrated one practical embodiment, with a modification thereof, embodying a preferred arrangement of parts and form of structure for the several elements of my mechanism, which particularly adapts the machine to the uses hereinbefore enumerated.

Other subsidiary objects will appear as the description of my invention progresses.

I attain these objects by means of the mechanism shown in the accompanying drawings, in which:

Fig. 2 is a side elevation of the same.

Fig. 3 is a fragmentary enlarged perspective view of a portion of the conveyer and bed over which the conveyer moves.

Fig. 4 is a longitudinal sectional elevation of the said machine.

Fig. 5 is a fragmentary side elevation of the rear end of the machine, showing the collecting and guiding units in inoperative position, as seen when the machine is moved from one location to another.

Fig. 6 is a rear elevation of the machine.

Fig. 7 is a sectional elevation of the collecting mechanism, on line 7—7 of Fig. 6.

Fig. 8 is a sectional elevation of a guiding mechanism associated with the collecting mechanism, on line 8—8 of Fig. 6.

Fig. 9 is an enlarged fragmentary view of one of the conveyer elements.

Fig. 10 is a section of the same on line 10—10 of Fig. 9.

Fig. 13 is a fragmentary plan view of a beater device employed in the rear of the cutting mechanism, and the operating means therefor.

Fig. 14 is a side elevation of an assembled machine particularly adapted for use in orchards where, because of the greater size of the prunings, it is not practicable to automatically collect the brush from the ground, this type of machine being arranged to receive the brush when thrown thereon by manual effort.

The same or like characters of reference are used throughout the several views of the drawings, and in the specification, hereinafter following, for illustrating the same or like parts of my machine.

Figure 1:
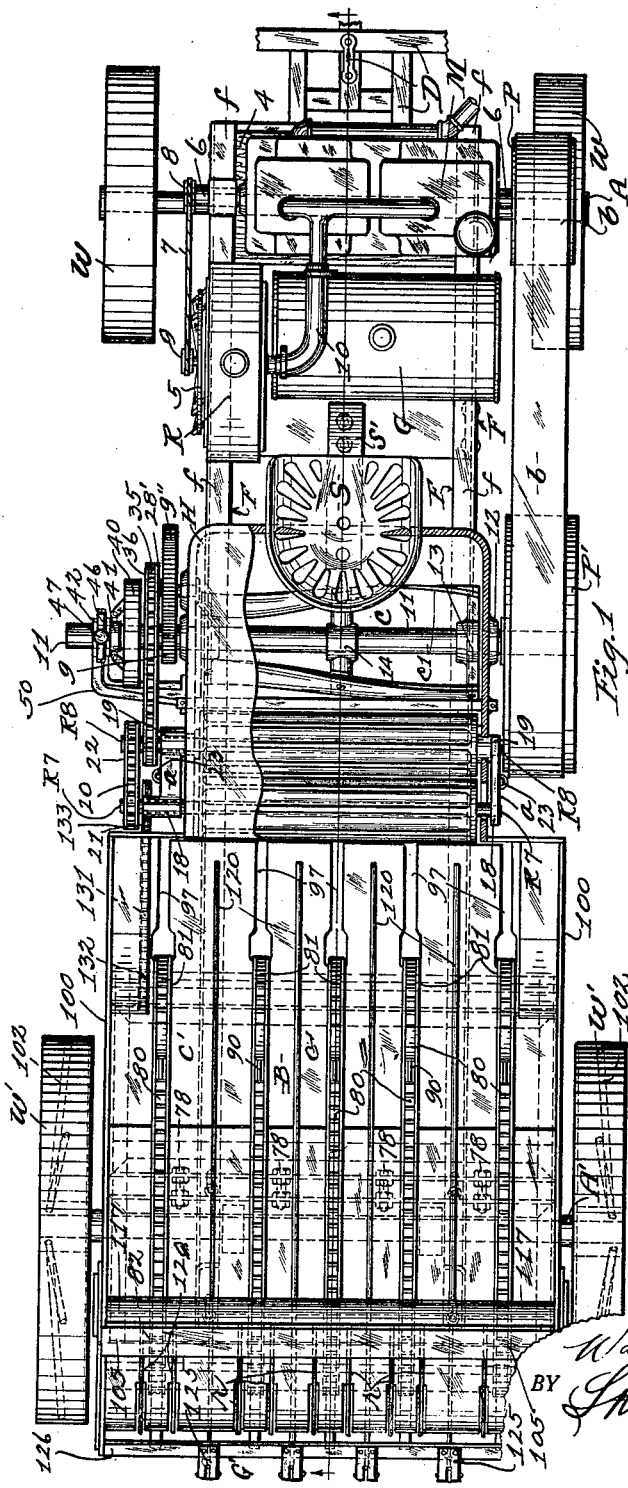
Fig. 1 is a plan view of my assembled machine, partly broken away to show the cutting mechanism.

Briefly described the machine embodies several units forming a part of a single machine, and including: a suitable rigid frame F on which all of the mechanism is mounted, and provided at the further end with pilot wheels W, W, mounted on an axle A to which is attached a suitable draft device D, whereby the machine may be moved over the surface of the ground by means of animals or tractor; traction wheels W', W', mounted on an axle A' at the rear end of said machine; an internal combustion motor M, preferably mounted at the front end of the machine and connected with a radiator R and a gas supply tank G, an operator's seat S mounted on a spring bar S' attached to the frame F; a cutting mechanism C mounted at the rear of the motor M, about midway of the ends of the frame F, a conveyer mechanism C' and a bed B mounted at the rear of the cutting mechanism and extending to the rear end of the machine, a rake or collecting device R, a guide device G' mounted at the extreme rear end of the conveyer mechanism, and suitable driving and operating connections between the motor M and the cutting and conveying mechanism as hereinafter more fully described.

The frame F comprises two main longitudinal members $f$, $f$, extending throughout the length of the machine and inclined downwardly at the rear ends, and transverse channel members 1, 2, and 3, connecting said longitudinal members and rigidly attached thereto for forming a structure of suitable strength and rigidity for supporting all of the mechanism of the machine. The motor M is mounted at the extreme front end of the machine on a block 4, bolted to the front transverse member 1 of the frame, and the radiator R is mounted as shown on one side of the frame above and attached to the longitudinal frame members $f$, and has a chain 5 suitably supported in front thereof, which is operatively connected to the crank shaft 6 of the motor M by means of a belt 7 operating over a drive pulley 8 on said crank shaft, and a driven pulley 9 connected with the chain.

The water jacket of the motor M is connected with the radiator at the top and bottom in the usual manner, by pipes, as shown at 10, and the operation of the motor which drives the chain 5 will serve to cool the motor in the usual manner.

On the opposite side of the machine from the radiator R the crank shaft 6 of the motor is extended and is provided with a driving pulley, P, which has a driving belt $b$ adapted to operate thereover, and over a driven pulley P' carried on the extended end of a transverse shaft 11 which parallels the crank shaft 6 of the motor and is journaled in bearings 12, 12 on opposite sides of a housing H, which is positioned substantially to the rear of the motor M and is mounted on the longitudinal frame members F, F. A cutter $C^1$ is mounted on and fixed to the driven shaft 11 and includes end spiders 13, 13, a central spider 14 capable of attachment to and having bosses thereon to receive the shaft 11, and a plurality of spirally formed cutting blades 14', 14', etc., which are attached to the spiders 13, 13 and 14.

The cutter $C^1$ is of substantially the same form and operates in practically the same manner as the cutter on lawn mowers and other devices embodying this type of cutter, and a cooperating cutting bar 15 of rectangular cross sectional area is provided for contact with the cutter 14, and is mounted at the ends on brackets 16, 16, attached to the opposite sides of the housing H. It will be understood that the cutting bar 15 parallels the axis of the cutting shaft 11, and the corners of said bar are arranged for contact with the cutter 14 and all of the four corners of said bar are adapted to constitute cutting edges so that when one of the edges may be dulled by use, the bar 15 which is of preferably square cross section may be turned so as to present a new cutting edge for contact with the cutter 14, thus eliminating the continual sharpening of a single edge. The adjustment of the cutter bar 15 may be accomplished by the removal of the pins 17 from the brackets 16 and changing the position of the bar. Rearwardly of the cutter $C^1$ I provide two couples of feed rollers mounted on parallel transverse axes, one in front of the other, each of said feeding couples embraces a lower roller, adapted for clock-wise rotation and having a fixed axis and an upper roller adapted for counter-clockwise rotation and having a yieldable axis the speed of all of said rollers being uniform.

Figure 12:
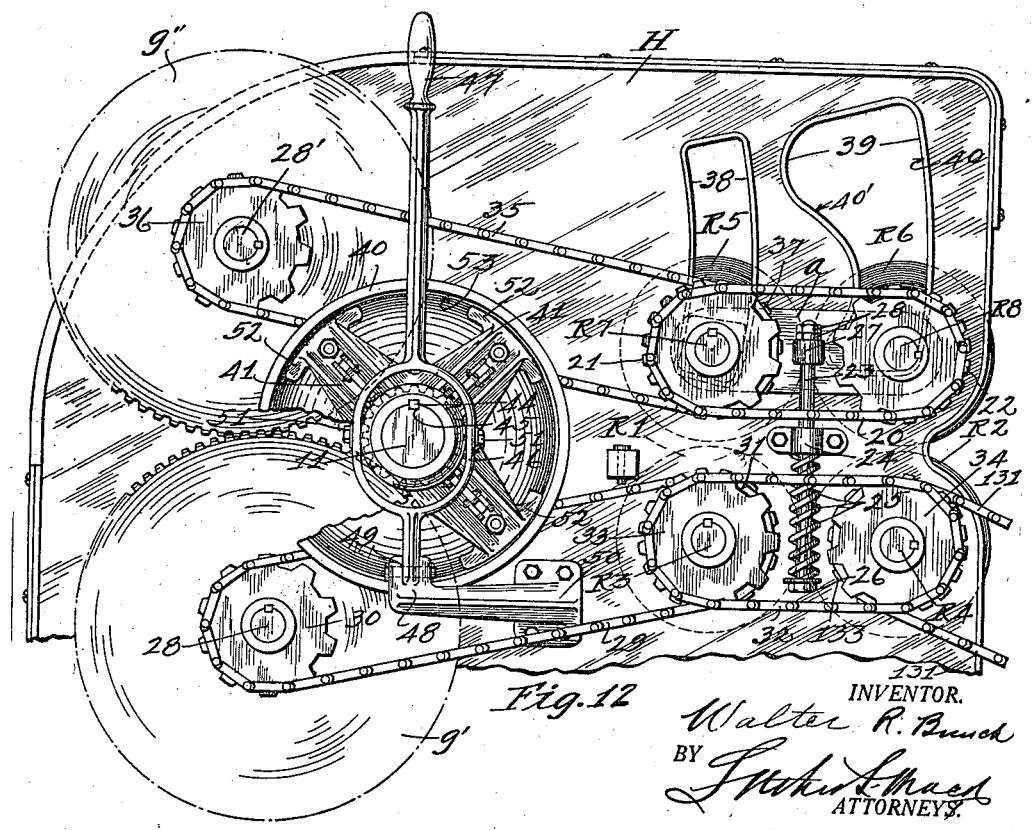
Fig. 12 is an enlarged side elevation of the same.

The lower rollers $R^1$ and $R^2$ of said couples are mounted respectively, on spaced transverse shafts $R^3$ and $R^4$, which are journaled at opposite ends in the sides of the housing H, while the upper rollers $R^5$ and $R^6$ of said couples are mounted on yieldable transverse spaced shafts $R^7$ and $R^8$. The shaft $R^7$ of roller $R^5$ is journaled at its ends in bearings 18, 18 in arms $a$, $a$, externally of the opposite sides of the housing H, and the shaft $R^8$ of roller $R^6$ is journaled at its ends in bearings 19, 19, of said arms. The shafts $R^7$, and $R^8$ of the rollers $R^5$ and $R^6$ respectively, are operatively connected together at one side of the machine, as shown in Fig. 12, by means of a sprocket chain 20 operating over sprockets 21 and 22, fixed to the ends of the shafts $R^7$ and $R^8$ respectively, and the arms $a$, $a$, which support said yieldable shafts are resiliently held on vertically disposed plungers 23 which are slidably supported in brackets 24 attached to the sides of the housing H and have coil springs 25 on the lower ends thereof, which are adapted to compress between the lower side of the brackets 24 and the head 26 on the lower end of said plungers. The upper ends of the plungers are rigidly attached to lugs 27 integral with the arms $a$, $a$, and have nuts 28 for holding the plungers and arms in proper relation.

Thus, the arms $a$, $a$, which carry the yieldable rollers $R^5$ and $R^6$ are permitted to be raised with respect to the rollers $R^1$ and $R^2$ so as to admit different thicknesses of brush between said rollers. The rollers $R^1$, $R^2$, $R^5$, and $R^6$ are corrugated, as shown, longitudinally thereof for providing ribs uniform, transverse, on the peripheries of said rollers, so as to provide gripping surfaces whereby the brush which is fed to the rollers may be readily held and advanced between the rollers to the cutter.

Figure 11:
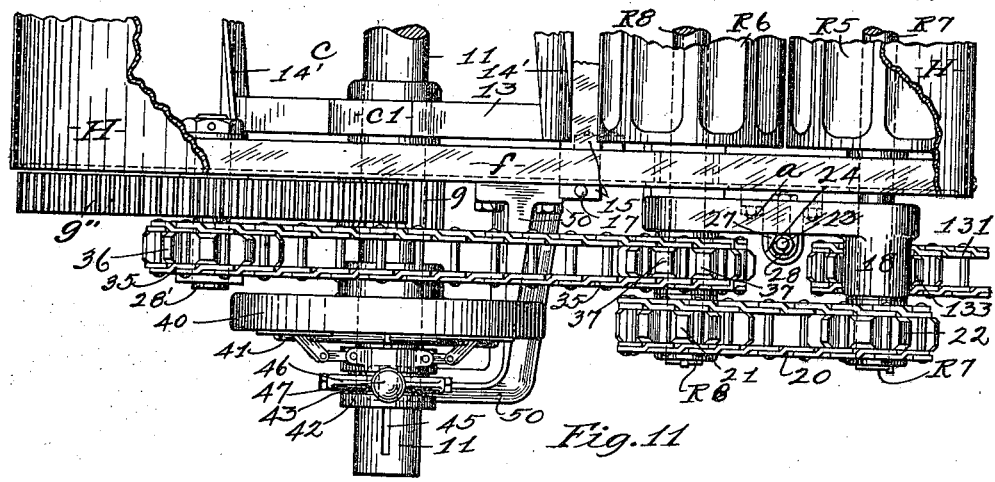
Fig. 11 is an enlarged plan view of the cutter and operating mechanism therefor, partly in section.

The cutter shaft 11 carries a pinion $g$ adjacent one side of the housing H and exterior of the longitudinal frame member $f$, and said pinion meshes with and is adapted to drive a relatively large gear $g'$ which is mounted on a shaft 28 supported in the side of the housing H and the longitudinal frame member $f$, as shown in Figs. 11 and 12. Another gear $g''$ of uniform size with the gear $g'$ is mounted thereabove on a shaft 28' fixed to the side of the housing H, and meshes with and is adapted to be driven by the gear $g'$. Rotary motion is conveyed to the fixed feed roller $R^1$ from the gear $g'$ by means of a sprocket chain 29 which operatively connects a sprocket 30 on shaft 28 of gear $g'$ and a sprocket 31 on a shaft $R^3$ of roller $R^1$; roller $R^2$ is operatively connected with roller $R^1$ by means of a sprocket chain 32 operating over a sprocket 33 on shaft $R^3$ and a sprocket 34 on shaft $R^4$.

Likewise, power is applied to roller $R^5$ from the shaft 28' of gear $g''$ by means of a sprocket chain 35 which operatively connects a sprocket 36 on the shaft 28' and a sprocket 37 on the shaft $R^7$. Roller $R^6$ is driven from the shaft $R^7$ in the manner hereinbefore described, and it will be observed by reference to Figs. 11 and 12 particularly, that the roller $R^5$ may yield relative to the roller $R^1$ in an arc about the axis of the shaft 28', an elongated arcuate slot 38 being provided in the sides of the housing H to permit the movement of the shaft $R^7$ therein. The roller $R^6$ may also yield independently of the roller $R^5$ and relative to the roller $R^2$, for the reason that openings 39 are provided in the sides of the housing H which have the sides 40 thereof arcuately formed with respect to the axis 28', while the sides 41 of said slots are arcuately formed about the axis of the shaft $R^8$ when said shaft is at rest, thus it will be seen that the shaft $R^8$ may yield in the slot 39 in an arcuate path with respect to the axis of the shaft $R^7$ or with respect to the axis of the shaft 28', the arms $a$, $a$ being correspondingly yieldable.

The cutter shaft 11 in addition to operating the cutter constitutes a power medium whereby power may be applied not only to the cutter, but to the feeding mechanism of the carrier mechanism and as shown in the drawings and hereinbefore described, the shaft 11 is permanently driven from the crank shaft 6 of the motor. It is not, however, desirable to impede the momentum of the cutter during the operation of the machine, while it may be frequently necessary and desirable to disconnect the feeding mechanism and the carrier mechanism from the driving elements, and to this end I have provided on one end of the shaft 11, a fly-wheel 40 which is rotatably connected with the pinion $g$ and is loose on the shaft 11. I also provide an expanding clutch device 41 which is fixed to a collar 42 and has an annular groove 43 therein, said collar is keyed to the shaft 11, by means of a key 44 in an elongated key-way 45, and a clutch operating yoke 46 is provided with a handle 47 and has its lower end 48 pivoted in a portion 49 of a bracket 59 attached to the side of the housing H. The yoke 46 has pins 51 on opposite sides thereof, which engage the groove 43 at the collar 42, so that the movement of the handle 47 will cause the collar 42 to slide inwardly on the shaft 11 and expand the shoes 52 on the clutch, so as to contact with their inner periphery 53 of the fly-wheel 40 when it is desired to impart rotary motion to the feed rollers and carrier mechanism.

A beater mechanism is provided at the rear end and near the upper side of the housing H, and just above the entrance to the first set of feed rollers $R^2$ and $R^3$ for holding the brush downwardly as it enters the grip of the said rollers, and facilitating the feeding operation. Said device includes a transverse shaft 54 journaled in brackets 55 attached to the upper rear portions of the housing H, and adapted to be rotated by means of a sprocket on the extended end of shaft $R^4$ or roller $R^2$ and a sprocket 57 on the shaft 54. A pair of spaced brackets 58 are pivotally mounted on the shaft 54 and have bearings 59 on the ends thereof which rotatably receive a shaft 60 paralleling the shaft 54, said shafts 54 and 60 are operatively connected by means of a sprocket pin 61 and sprockets 62 and 63 on the shaft 54, and 60 respectively. Intermediate the brackets 58, 58, I provide a beater element which includes a plurality of transverse parallel and uniformly spaced bars 64, 64, connected together at the ends by means of members 65, 65. The beater element is adapted to be held downwardly in its extreme position by a spring 66 which is adapted to compress between the ends of the supporting brackets 65 and arms 67 on the brackets 58. This structure is shown in Figs. 13 and 14.

The carrier mechanism C', as shown in Fig. 3 is mounted on the bed B in the rear end of the machine, and said bed may be inclined as shown in Figs. 2 and 4, or horizontally disposed as shown in Fig. 14, depending upon the use to which the machine is to be put. This mechanism is operated by means of a pair of transverse parallel shafts 68 and 69 which are substantially spaced apart, shafts 68 and 69 are mounted respectively on movable frames 70 and 71, which are of rectangular form and of channeled cross section, said shafts are carried respectively in bearings 72 and 73 attached to the outermost channel members 74 and 75 of said movable frames, and the innermost channel members 76 and 77 of said frames, are connected by means of a plurality of bolts 78 having nuts 79, 79, etc., on opposite sides of the webs of said channeled members, so that the frames 70 and 71 which carry the shafts 68 and 69 may be adjusted longitudinally of the machine for spacing and holding the shafts 68 and 69 apart to a desirable extent. The conveyer C' embodies a plurality of sprocket pins 80, 80, etc., which operate over sprockets 81, 81, etc., on the shaft 68 and over similar sprockets 82, 82, etc., on the shaft 69 at the rear end of the machine. The movable frame 70 which carries the shaft 68 has an upper bed plate 83 and a lower bed plate 84 which are spaced apart and attached to the opposite legs of the channels 78 and 76, and provide smooth surfaces for the chains 80 of the conveyer to move over. Likewise, the movable frame 71 at the rear end of the bed has an upper plate 85 and a lower plate 86 similarly arranged and attached to the channel members 75 and 77, the plate 85 extending substantially forwardly of the rear end of the front bed plate 83 and over-lapping the same, as shown. At the rear end of frame 71 a curved plate 87 is attached to the legs of the channel 75 as shown in Fig. 3, the curve of this plate conforming to the curve of the sprocket chains 80, the plates 87 having openings therein through which the rear sprockets 82 are extended.

Each of the sprocket chains 80 of the conveyer C' has a plurality of carrier members 90 of the character shown in Figs. 9 and 10 mounted thereon, said carrier members are pivotally connected to two of the pins 91 of the chain 80 and have spaced lugs 92 and 93 thereon for receiving said pins, and adapted to be used in lieu of one of the links of the chain, said carriers including a rib 93 which projects at right angles to the chain 80 and the upper end of which is curved rearwardly, a horizontal rib 94 which is adapted to rest on the upper side of chain 80 and has a curved end portion 95 adapted to fit over the adjacent chain 91 of the chain, and a connecting web 96. These carriers are so arranged and connected with the chains 80 that when the conveyer C' moves forwardly over the upper surface of the bed B, any matter which may be deposited on said bed will be moved forwardly on the bed and into the grip of the feed rollers. Elongated openings 97 are provided in the bed B forwardly of the shaft 68, so as to permit the carriers 90 to move downwardly therethrough, and thence around and under the lower portion of the bed and upwardly over the sprockets 82.

The rear axle A' is carried in brackets 98 attached to the longitudinal frame members f' of the frame, and the movable frame 71 of the conveyer has elongated slots 99 formed therein through which the said axle extends and which are provided so as to permit the adjustment of the frame 71 relative to the axle.

At the sides of the frame and the bed B of the conveyer, I provide side enclosing members 100, 100 which are substantially wider as at 101, at the rear end of the housing H, and the rear traction wheels W', W' are provided with metal discs 102 which may be suitably attached to the spokes and rim of the wheel for preventing the ends of the brush from entering the spaces between the spokes and either preventing or delaying the movement of the brush to the feeding rollers.

In the form of device shown in Fig. 14, the mechanism hereinbefore described will suffice to all intents and purposes for ordinary work in citrus orchards and the like, where brush of large caliber may be manually deposited on a conveyer C', and it will be noted that for this type of work the bed of the machine is horizontal rather than inclined, as just described. For many classes of work, however, and particularly in vineyards and in orchards where the brush is of small caliber the manual effort required for collecting and depositing the brush on the bed of the machine can be eliminated by the provision of a collecting and guiding mechanism which I have clearly illustrated in Figs. 1, 2, 4, 7 and 8. I will first describe the collecting device which embodies a plurality of curved rods r, r, which are uniformly spaced transversely of the rear end of the machine and are staggered with respect to the conveyer chains 80. The upper ends of the rakes r, overly the rear end of the bed B and are commonly supported at opposite sides as a unit, on standards 103, 103, which are placed diagonally by means of braces 104, 104. At the upper ends of said standards I provide a transverse angle member 105, which has ends 106 adapted to be pivotally held on the standards 103 by means of pins 107, and adjustable braces 108 are also provided at the ends of the support 105 which are pivotally attached to the ends of said support and are adapted to be held at their lower ends on pins 109 carried in the braces 104 for holding the rake unit in operative position, as shown in Fig. 7. The upper ends 110 of the rods $r$ are formed into loops and are pivotally held on a transverse rod 111 carried in brackets 112 attached to the forward side of the member 105 so that each of the rake members $r$ may be yieldable independently of the other members, said members are resiliently held in normal position by means of coil springs 113 which are carried in socket members 114 attached to the upper web of the angle member 105, and depending therefrom. The members 114 have elongated slots 115 in their lower portions through which the members $r$ extend, and pins 116 are provided in the members 114 and disposed at right angles to the slot 115 for limiting the downward movement of the members 5. A protecting plate 117 is rigidly attached at its upper edge 118 to the forward web of the member 105 and is curved outwardly and downwardly around the hinges 110 of the members $r$, and extends rearwardly under said rods for a substantial distance, and the rear portion of the plate 117 is curved upwardly and provided with slots 118' through which the rods $r$ extend downwardly and are movable.

When the rake unit is elevated into inoperative position as shown in Fig. 5, the member 105, the rake elements $r$, and the plate 117 are all bodily moved together into the position shown. It will be observed by reference to Figs. 2 and 4 that the curved portions of the members $r$ are slightly spaced from the pins 80 of the conveyer, and the carriers 90 when raised upwardly over the rear sprockets 82 move between and project outwardly from the rakes. The lower portions $r'$ of the rakes $r$ extend upwardly and are adapted to move over the surface of the ground and gather up the loose brush on the surface thereof as the brush is moved thereover. Thus, it will be seen that the movement of the machine over the ground will force the brush onto the members $r$ of the rake until the brush is taken up by the carrier 90 and moved upwardly and thence forwardly onto the pins 80 between the bed plate B and the plate 117.

It is desirable however in addition to the provisions enumerated to hold the brush as closely in contact with the bed of the machine as possible as it is moved forwardly and over and to this end I provide a plurality of longitudinal rods 120, 120, etc., which have loops 121, etc., at their rear ends pivotally held on a transverse rod 122, said rods extend forwardly of the bed B of the machine to a point just to the rear of the feed rollers, and are staggered with respect to the pins 80 of the conveyer. These rods constitute guides which overly the bed plate, and as the brush is moved upwardly and forwardly over the bed by means of the carriers 90, they are moved under the rods 120 which serve to hold them firmly in the grip of the carriers. The hinges 121 of said rods are supported on a transverse plate 123 which has lugs 124 for receiving the ends of the rods 122 and which is connected at its forward portion 125 with a transverse angle member 126 carried on the rear end of a pair of supports 127, 127, attached to the sides of the frame members $f, f$. Member 126 has a socket member 127 provided with an internal coil spring 128 and attached to the members 125 and 126, said socket member is of substantially the same form as that employed in the rake unit, and shown in Figs. 7 and 8, and are provided with slots 129 through which the rods 120 extend, and pins 130 in their lower ends for limiting the downward movement of said rods. The conveyer mechanism is operated by means of a sprocket chain 131 operating over a sprocket 132 on shaft 68, and a sprocket 133 on shaft $R^4$ of roller $R^2$.

Now, it will be observed that from the consideration of the foregoing description of the structure and operation of my mechanism, that as the machine is drawn forwardly by suitable means over the surface of the ground between the rows of trees or vines, as the case may be, the brush will be collected from the ground automatically as the machine progresses in its movement, and elevated by means of the rake and carrier units described, onto the bed plate of the machine and beneath the guide unit G until the forward end of the inclined or horizontal bed of the machine is reached, whereupon the brush will be pressed downwardly by means of the beater mechanism described, and drawn into the first set of feed rollers $R^2$ and $R^6$, which are relatively yieldable and are held in operative relation by means of the springs 25 of sufficient tension to prevent the slippage of the brush as it is moved therethrough. The brush is fed from the rollers $R^2$ and $R^6$ onto the grip of the rollers $R^1$ and $R^5$ and thence into the grip of the cutter $C^1$, after which the cuttings are dropped through the bottom opening of the the housing H onto the ground from which the brush was collected.

The speed of the cutter is substantially greater than that of the other elements of the machine, so as to provide ample capacity for the machine and to cut the brush into particles of minimum size.

All of the elements of my mechanism are of massive structure and ample strength to effectively cut limbs of three inch caliber into small particles or approximately one-half inch pitch, and when arranged and designed as shown and described, the prunings from an orchard or vineyard may be quickly and readily disposed of at a minimum amount of time and at a maximum expense, and all of the value of said prunings may be retained and utilized by redepositing the same upon the ground for the purpose of fertilization of the soil.

It will be understood that my machine may be employed for other purposes than cutting brush and prunings from trees or the like, and the structure, form and arrangement of the several elements thereof may be modified within the scope of the appended claims without departing from the spirit of my invention or enlarging the scope thereof.

What I claim is:

1. A brush cutting machine including a rigid frame, a power element mounted on said frame, and a rotary cutting mechanism also mounted on said frame and including a plurality of feeding elements for conveying matter to be cut to the cutter, and a cutter cooperating therewith, conveying means for delivering matter to said feeding elements, said conveyers including a plurality of parallel endless carriers for moving matter forwardly of the machine to the cutting mechanism, and a collecting device supported at the end of said conveyer mechanism and movable over the surface of the ground for receiving matter deposited thereon during the progress of the machine, said collecting units embracing a plurality of curved rake elements commonly mounted and independently yieldable, means for simultaneously operating all of said rake elements for moving them into inoperative position, and a guiding mechanism supported rearwardly of said collecting mechanism and extended longitudinally over the bed of the machine, for the purpose described.

2. A brush cutting machine including a rigid frame, a power element mounted on said frame, and a rotary cutting mechanism also mounted on said frame and including a plurality of feeding elements for conveying matter to be cut to the cutter, and a cutter cooperating therewith, conveying means for delivering matter to said feeding elements, said conveyers including a plurality of parallel endless carriers for moving matter forwardly of the machine to the cutting mechanism, and a collecting device supported at the end of said conveyer mechanism and movable over the surface of the ground for receiving matter deposited thereon during the progress of the machine, said collecting units embracing a plurality of curved rake elements commonly and independently yieldable, means for simultaneously operating all of said rake elements for moving them into inoperative position, and a guiding mechanism supported rearwardly of said collecting mechanism and extended longitudinally over the bed of the machine, said guiding mechanism including a plurality of longitudinally disposed rods commonly mounted and independently yieldable for the purpose described.

3. A brush cutting machine including a portable frame, having traction wheels thereon, a power element on said frame, a plurality of conveyer chains mounted on one end of said frame, a plurality of carriers connected with said chains for moving matter to be cut forwardly of the machine, and a cutting mechanism positioned forwardly of said conveyer mechanism and including a plurality of rotary feeding elements and a rotary cutter, whereby the matter fed thereto may be reduced to small particles, and means for operably connecting said power element with said cutting and conveying mechanism, said feeding elements being arranged in pairs and one of the elements of each pair being yieldable relative to the other element of the pair, and also in an arcuate path relative to the axis of the cutter.

4. In a brush cutting machine, a cutting mechanism, including a pair of rotary feeding rollers having a fixed axis and substantially spaced apart, a cutting bar paralleling the axes of said rollers and having its cutting edge aligned with the upper portions of the peripheries of said rollers, a rotary cutter having an axis parallel to said rollers and said cutting bar, and provided with blades arranged in shearing contact therewith, and a pair of yieldable feeding rollers adjustable relative to said fixed rollers, and means for operably connecting said cutter with said feeding rollers, said yieldable rollers being movable in an arcuate path relative to the axis of said cutter, for the purpose described.

5. In a brush cutting machine a cutting mechanism including a pair of rotary feeding rollers having a fixed axis and substantially spaced apart, a cutting bar paralleling the axes of said rollers and having its cutting edge aligned with the upper portion of the peripheries of said rollers, a rotary cutter having an axis parallel to said rollers and said cutting bar, and provided with blades arranged in sheering contact therewith, and a pair of yieldable feeding rollers adjustable relative to said fixed rollers, and means for operably connecting said cutter with said feeding rollers, said yieldable rollers being movable in an arcuate path relative to the axis of said cutter, and one of said yieldable rollers being also movable in an arcuate path relative to the axis of the other yieldable roller.

6. In a brush cutting machine, a rigid frame, a pair of relatively adjustable frame members mounted thereon, and forming a bed therefor, a transverse shaft mounted on each of said movable frames, means for rotating said shafts, a plurality of conveyer elements connecting said shafts, a plurality of carriers attached to said conveyer elements, and a plurality of collecting units mounted above said bed and curved inwardly and forwardly around the rear ends of said conveyers, said collecting units being commonly mounted and independently yieldable for the purpose described.

7. In a brush cutting machine, a rigid frame, a pair of relatively adjustable frame members mounted thereon and forming a bed therefor, a transverse shaft mounted on each of said movable frames, means for rotating said shafts, a plurality of conveyer elements connecting said shafts, a plurality of carriers attached to said conveyer elements, and a plurality of collecting units mounted above said bed and curved inwardly and forwardly around the rear ends of said conveyers, said collecting units being commonly mounted and independently yieldable, and a plurality of forwardly disposed longitudinal members overlying said bed and staggered with respect to said conveyers and said collecting units, for holding matter carried by said conveyers in position.

8. In a brush cutting machine a rigid frame, a pair of relatively adjustable frame members mounted thereon, and forming a bed therefor, a transverse shaft mounted on each of said movable frames, means for rotating said shafts, a plurality of conveyer elements connecting said shafts, a plurality of carriers attached to said conveyer elements, and a plurality of collecting units mounted above said bed and curved inwardly and forwardly around the rear ends of said conveyer, said collecting units being commonly mounted and independently yieldable, and a plurality of forwardly disposed longitudinal members overlying said bed and staggered with respect to said conveyers and said collecting units, for holding matter carried by said conveyers in position, said longitudinal members being commonly mounted and independently yieldable, for the purpose described.

9. In a brush cutting machine a rigid main frame, a pair of relatively movable frames mounted thereon and spaced apart, means for adjusting said frames to desired positions, overlying plates carried on the top of said frames and forming a bed for the machine, other plates carried on the bottoms of said frames, a plurality of conveyer chains operably mounted on and extended behind opposite ends of said movable frames, and spaced apart, said chains operating over the surface of the plates on the tops and bottoms of said frames, a plurality of carriers attached to each of said conveyer chains for moving matter forwardly of the machine, gears supported above the bed of the machine and extending forwardly into contact with the ground for collecting and delivering matter to said carriers, and a plurality of longitudinal guide members overlying the bed of the machine and staggered with respect to said chains, for holding the matter thus delivered in contact with the carrier.

10. A brush cutting machine including a rigid frame having an inclined bed provided with parallel longitudinal openings therein, a plurality of conveyer chains movable over the upper surface of said bed and through said openings, and extending therefrom at the rear ends, a collecting unit embodying a plurality of rake elements overhanging the rear end of said bed and extended forwardly thereof, at their lower ends when in operative position, means for bodily moving all of said elements together and supporting the same in inoperative position and separate means for each of said elements for resiliently and yieldably supporting the same in operative position.

11. In a brush cutting machine a rigid frame, a bed on said frame, a pair of transverse shafts substantially spaced apart on said frame, a plurality of sprockets on said shafts arranged in longitudinal alinement, sprocket chains connecting said sprockets and movable over said bed, and adjustable supporting means for said shafts whereby the spacing of said shafts may be changed for stretching said chains, a transverse beam supported on said frame and spaced from said bed, and a plurality of downwardly and rearwardly curved rake elements independently pivoted on said beam, as described.

12. In a brush cutting machine a rigid frame, a bed on said frame, a pair of transverse shafts substantially spaced apart on said frame, a plurality of sprockets on said shafts arranged in longitudinal alinement, sprocket chains connecting said sprockets and movable over said bed, and adjustable supporting means for said shafts whereby the spacing of said shafts may be changed for stretching said chains, a transverse beam supported on said frame and spaced from said bed, a plurality of downwardly and rearwardly curved rake elements independently pivoted on said beam, and independent means for yieldably holding said rake elements in position.

13. In a brush cutting machine a rigid frame, a bed on said frame, a pair of transverse shafts substantially spaced apart on said frame, a plurality of sprockets on said shafts arranged in longitudinal alinement, sprocket chains connecting said sprockets and movable over said bed, and adjustable supporting means for said shafts whereby the spacing of said shafts may be changed for stretching said chains, a transverse beam supported on said frame and spaced from said bed, a plurality of downwardly and rearwardly curved rake elements independently pivoted on said beam, and a plurality of longitudinal bars pivoted at their rear ends to said beam and extending forwardly of said bed.

14. In a brush cutting machine a rigid frame, a bed on said frame, a pair of transverse shafts substantially spaced apart on said frame, a plurality of sprockets on said shafts arranged in longitudinal alinement, sprocket chains connecting said sprockets and movable over said bed, and adjustable supporting means for said shafts whereby the spacing of said shafts may be changed for stretching said chains, a transverse beam supported on said frame and spaced from said bed, a plurality of downwardly and rearwardly curved rake elements independently pivoted on said beam, and a plurality of longitudinal bars pivoted at their rear ends to said beam and extending forwardly of said bed and staggered with respect to said conveyers.

15. In a brush cutting machine a rigid frame, a bed on said frame, a pair of transverse shafts substantially spaced apart on said frame, a plurality of sprockets on said shafts arranged in longitudinal alinement, sprocket chains connecting said sprockets and movable over said bed, an adjustable supporting means for said shafts whereby the spacing of said shafts may be changed for stretching said chains, a transverse beam supported on said frame and spaced from said bed, a plurality of downwardly and rearwardly curved rake elements independently pivoted on said beam, a plurality of longitudinal bars pivoted at their rear ends to said beam and extending forwardly of said bed and staggered with respect to said conveyers, and means for resiliently holding said bars in position on said bed.

16. In a brush cutting machine a rigid frame, a bed on said frame, a pair of transverse shafts substantially spaced apart on said frame, a plurality of sprockets on said shafts arranged in longitudinal alinement, sprocket chains connecting said sprockets and movable over said bed, and adjustable supporting means for said shafts whereby the spacing of said shafts may be changed for stretching said chains, a transverse beam supported on said frame and spaced from said bed, a plurality of downwardly and rearwardly curved rake elements independently pivoted on said beam, and a plate attached to said beam and underlying the pivoted ends of said rake elements.

17. In a brush cutting machine a rigid frame, a bed on said frame, a pair of transverse shafts substantially spaced apart on said frame, a plurality of sprockets on said shafts arranged in longitudinal alinement, sprocket chains connecting said sprockets and movable over said bed, and adjustable supporting means for said shafts whereby the spacing of said shafts may be changed for stretching said chains, a transverse beam supported on said frame and spaced from said bed, a plurality of downwardly and rearwardly curved rake elements independently pivoted on said beam, a plate attached to said beam and underlying the pivoted ends of said rake elements, and means for pivotally supporting said beam whereby said plate and said rake elements may be moved together for rendering said rake elements inoperative.

18. In a brush cutting machine the combination of a portable frame, a rotary cutter journaled transversely on said frame, a stationary cutter bar paralleling the axis of and cooperating with said cutter, a pair of spaced forwardly rotating rollers mounted substantially in the same horizontal plane, the forms of said rollers being adjacent said cutter bar, a yieldable roller above each of said first mentioned rollers, a shaft for carrying said rollers, said frame having slots at the ends of said shafts, bearings held in said slots for receiving the shafts of said yieldable rollers whereby said rollers may be guided in their yielding movement, and an inclined bed rearwardly of said roller, and a plurality of transversely spaced conveyer elements arranged for movement over said bed for delivering matter to said rollers.

WALTER R. BUNCH.

Witnesses:
J. W. SHEEHY,
IRENE BREEN.